United States Patent [19]

Jones, Jr.

[11] Patent Number: 5,092,617

[45] Date of Patent: Mar. 3, 1992

[54] TRUCK CAB ACCESSORY STEP APPARATUS

[76] Inventor: Harvey Jones, Jr., Rt. 2, Box 448, LaGrange, N.C. 28551

[21] Appl. No.: 636,190

[22] Filed: Dec. 31, 1990

[51] Int. Cl.⁵ .............................................. B60R 3/00
[52] U.S. Cl. .................................. 280/166; 187/9 R
[58] Field of Search .................. 280/166, 164.1, 164.2, 280/163; 187/9 R; 182/84, 85, 90; 296/71

[56] References Cited

U.S. PATENT DOCUMENTS

| | | | |
|---|---|---|---|
| 4,071,260 | 1/1978 | Marshall, Sr. | 280/166 |
| 4,169,623 | 10/1979 | Smith | 296/71 X |
| 4,217,971 | 8/1980 | Rivinius | 280/166 X |
| 4,324,317 | 4/1982 | Winkelblech | 280/163 X |
| 4,356,894 | 11/1982 | Everett | 280/166 X |
| 4,982,974 | 1/1991 | Guidry | 280/166 X |

Primary Examiner—David M. Mitchell
Assistant Examiner—Martin Gerich
Attorney, Agent, or Firm—Leon Gilden

[57] ABSTRACT

A truck cab accessory step includes a pneumatic cylinder mounted to a side wall of an associated truck cab, with a step orthogonally mounted to a lower end of a cylinder piston rod reciprocatably mounted within the cylinder. A manually manipulatable valve effects raising and lowering of the accessory step platform relative to the truck cab.

1 Claim, 4 Drawing Sheets

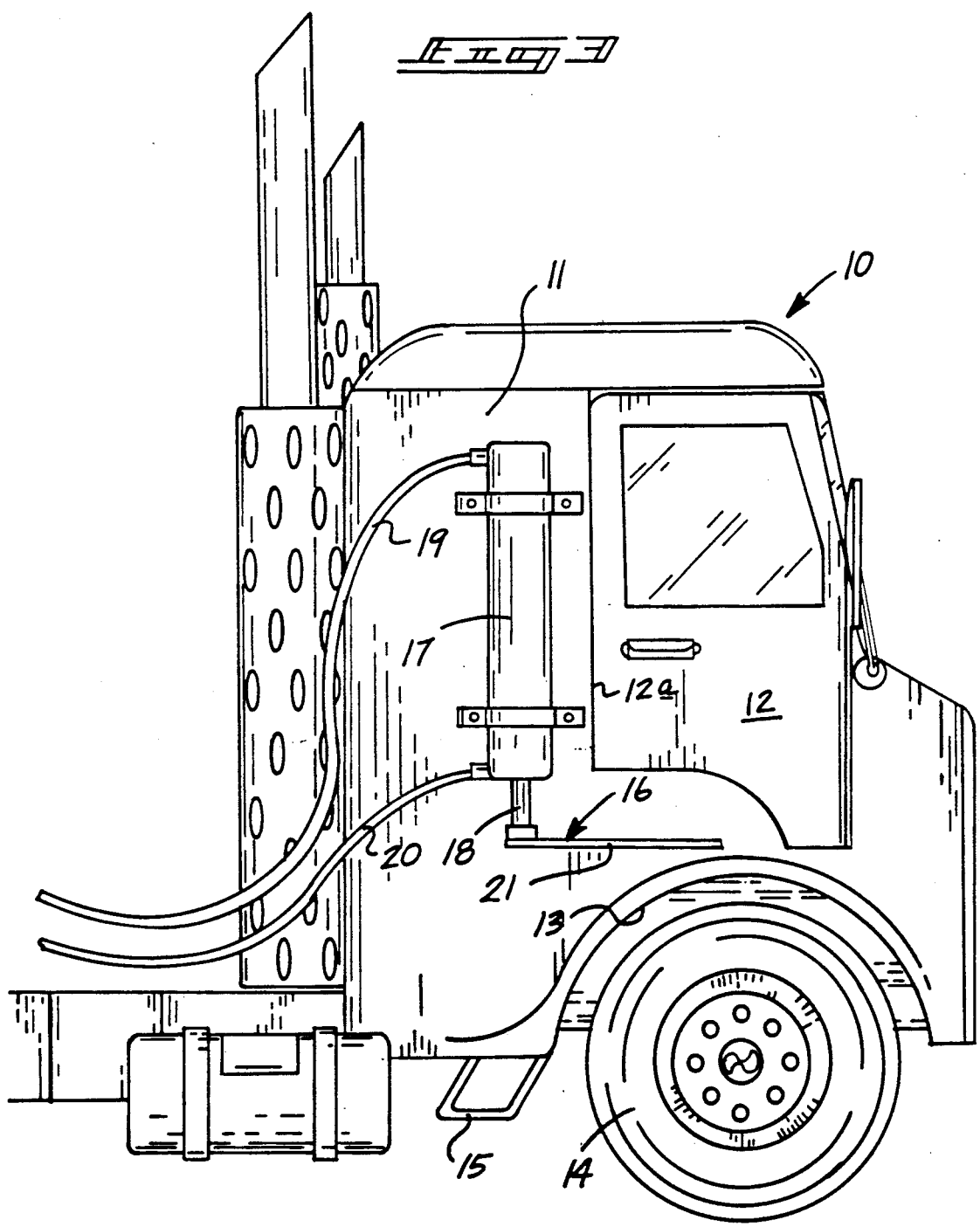

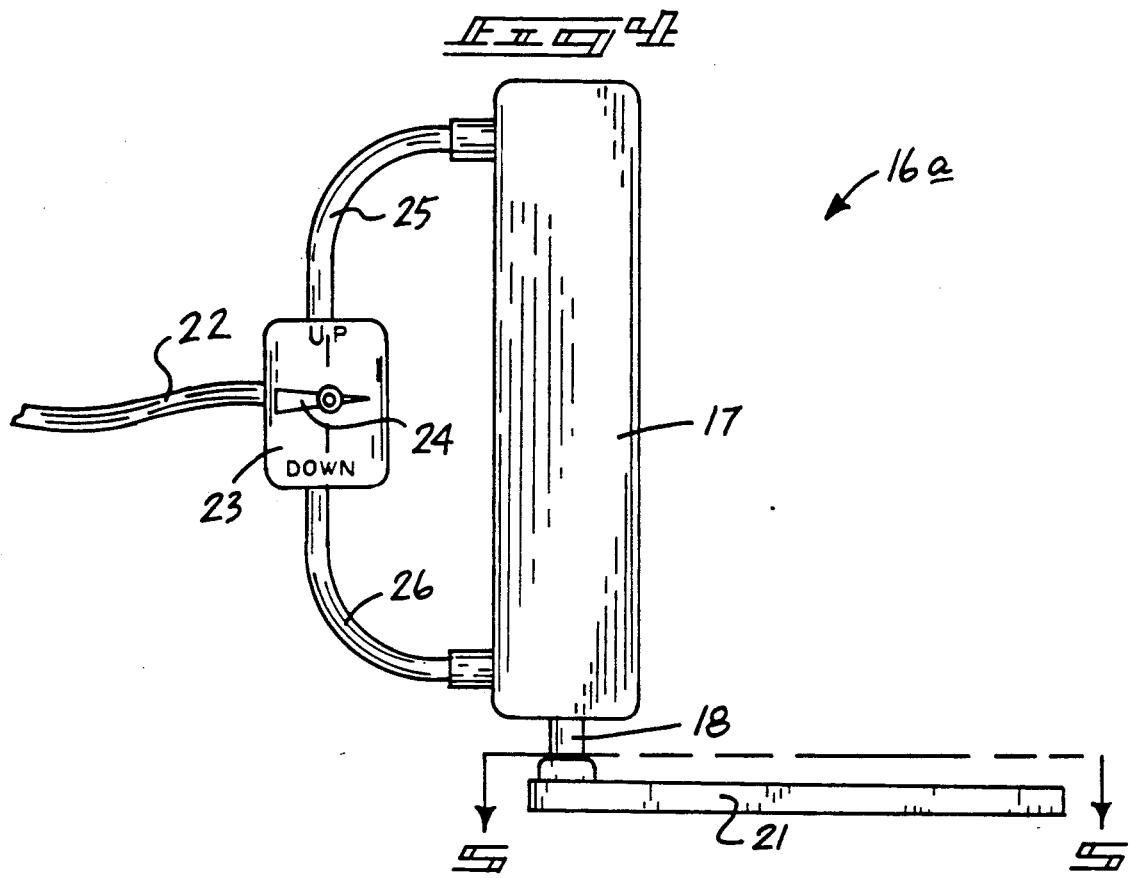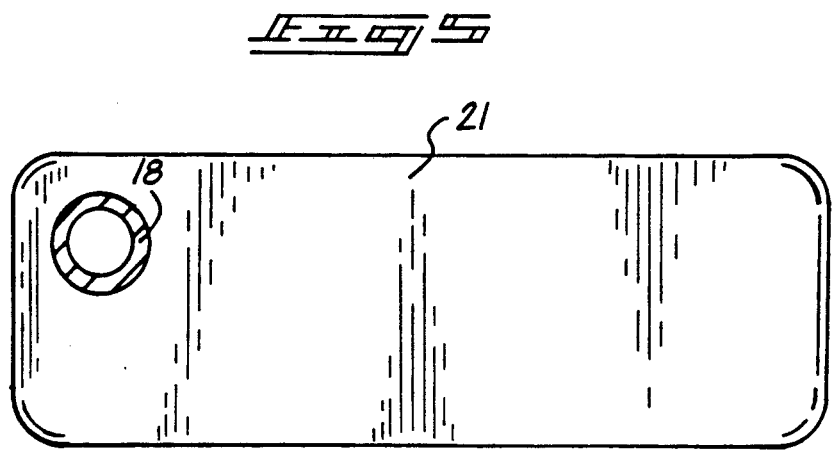

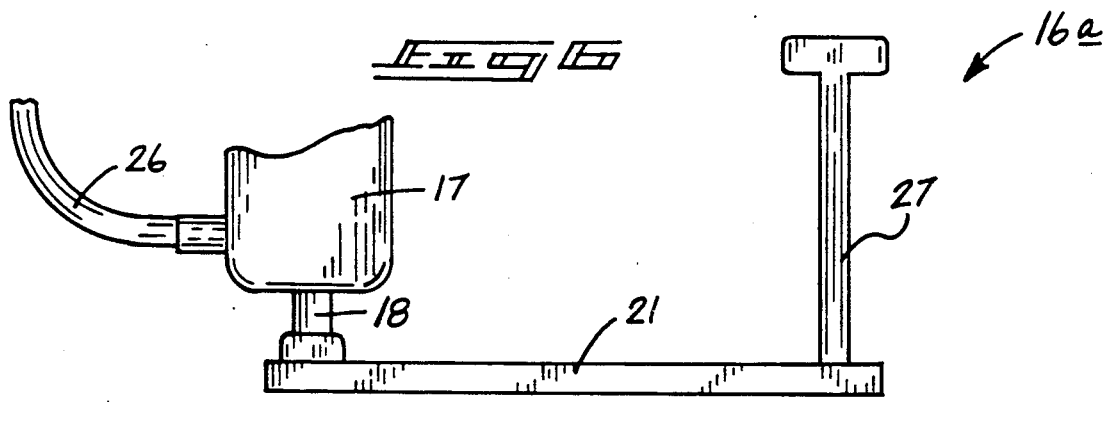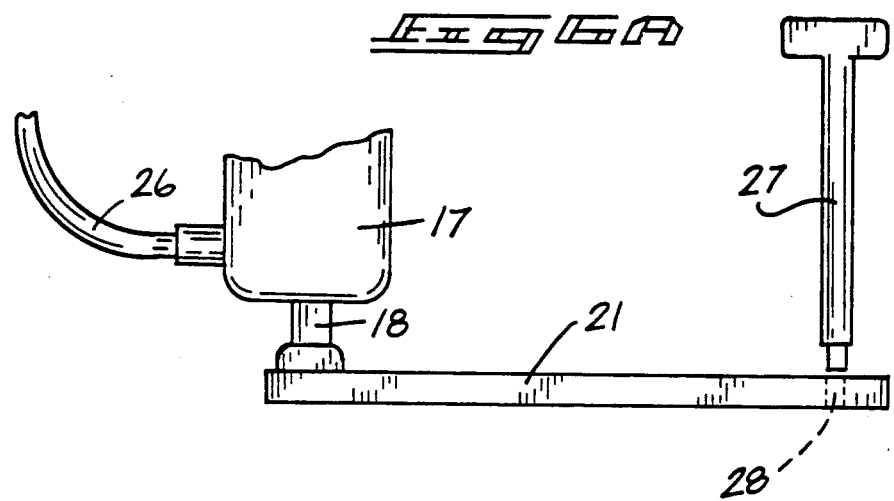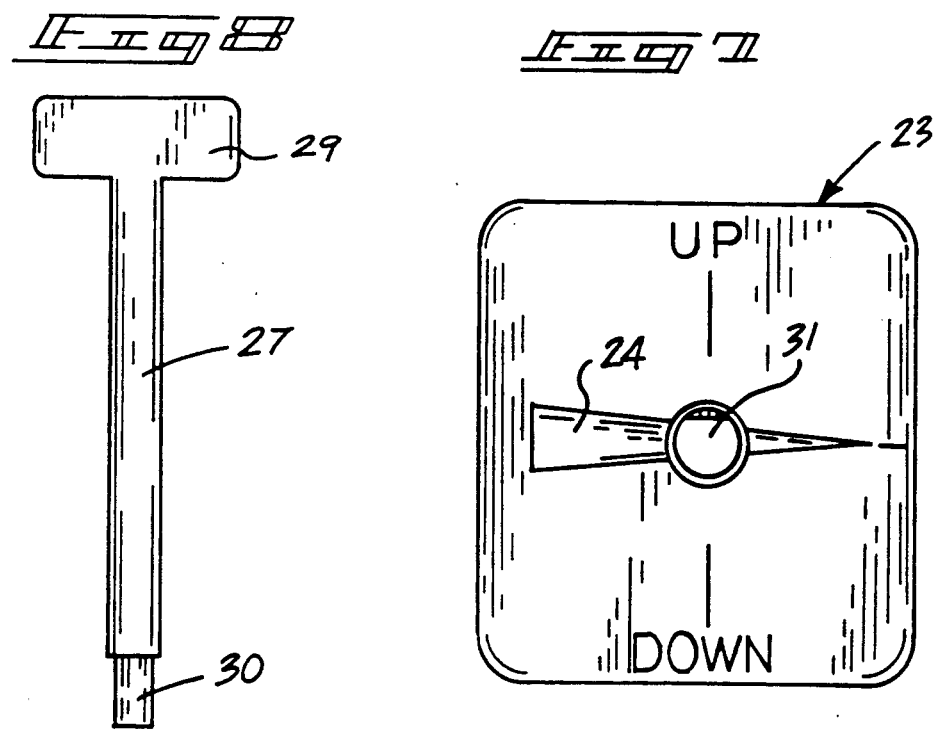

TRUCK CAB ACCESSORY STEP APPARATUS

BACKGROUND OF THE INVENTION

1. Field of the Invention

The field of invention relates to accessory step apparatus, and more particularly pertains to a new and improved truck cab accessory step apparatus wherein the same provides an accessory step arranged for selective vertical positioning relative to a truck cab.

2. Description of the Prior Art

Removable stairs relative to various portals is desirable in the prior art and has been addressed to permit selective positioning of a step relative to portal for convenience of entry thereof. Examples of removable stair construction may be found in U.S. Pat.No. 4,243,120 to pratt, Jr., et al. wherein a portable step organization is slidably mounted relative to spaced rails utilizing guide wires to permit selective repositioning of the step construction relative to an entrance.

U.S. Pat. No. 4,124,091to Dudynskyj sets forth a wheel chair lift apparatus wherein a sprocket drive lifts a platform relative to an entrance permitting lifting of a wheel chair thereto.

U.S. Pat. No. 4,125,284 to Hicks, et al. sets forth a vehicle with a convertible step and foot rest wherein the step is pivotally mounted to raised elevation to provide additional storage support relative to the vehicle.

U.S. Pat. No. 4,679,810 to Kimball sets forth a three-wheeled vehicle utilizing an operator step that is removable mounted vertically relative to a seat of the vehicle.

As such, it may be appreciated that there continues to be a need for a new and improved truck cab accessory step apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of removal stair constructions now present in the prior art, the present invention provides a truck cab accessory step apparatus wherein the same sets forth a reciprocatably mounted step relative to a truck cab and an associated door. As such, the general purpose of the present invention, which will be described subsequently in greater detail, is to provide a new and improved truck cab accessory step apparatus which has all the advantages of the prior art vertically positionable stairs and none of the disadvantages.

To attain this, the present invention provides a step including a pneumatic cylinder mounted to a side wall of an associated truck cab, With a step orthogonally mounted to a lower end of a cylinder piston rod reciprocatably mounted within the cylinder. A manually manipulatable valve effects raising and lowering of the accessory step platform relative to the truck cab.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. patent and Trademark Office and the public generally, and especially the scientists, engineers and practitioners in the art who are not familiar with patent or legal terms or phraseology, to determine quickly from a cursory inspection the nature and essence o±the technical disclosure of the application. The abstract is neither intended to define the invention of the application, which is measured by the claims, nor is it intended to be limiting as to the scope of the invention in any way.

It is therefore an object of the present invention to provide a new and improved truck cab accessory step apparatus which has all the advantages of the prior art vertically positionable stairs and none of the disadvantages.

It is another object of the present invention to provide a new and improved truck cab accessory step apparatus which may be easily and efficiently manufactured and marketed.

It is a further object of the present invention to provide a new and improved truck cab accessory step apparatus which is of a durable and reliable construction.

An even further object of the present invention is to provide a new and improved truck cab accessory step apparatus which is susceptible of a low cost of manufacture with regard to both materials and labor, and which accordingly is then susceptible of low prices of sale to the consuming public, thereby making such truck cab accessory step apparatus economically available to the buying public.

Still yet another object of the present invention is to provide a new and improved truck cab accessory step apparatus which provides in the apparatuses and methods of the prior art some of the advantages thereof, while simultaneously overcoming some of the disadvantages normally associated therewith.

Still another object of the present invention is to provide a new and improved truck cab accessory step apparatus wherein the same arranges a vertically repositionable step construction relative to a truck cab and its associated door.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view, taken in elevation, of the instant invention.

FIG. 4 is an orthographic side view of a modified reciprocatable stair construction utilized by the instant invention.

FIG. 5 is an orthographic view, taken along the lines 5—5 of FIG. 4 in the direction indicated by the arrows.

FIG. 6 is a modified reciprocatable stair utilized by the instant invention.

FIG. 6a sets forth a modified stair construction of FIG. 6, with the handle removed therefrom.

FIG. 7 is an orthographic view of the handle for use with valve of the invention.

FIG. 8 is an orthographic view of the valve member utilized by the instant invention.

DESCRIPTION OF THE PREFERRED EMBODIMENT

Figure 1:
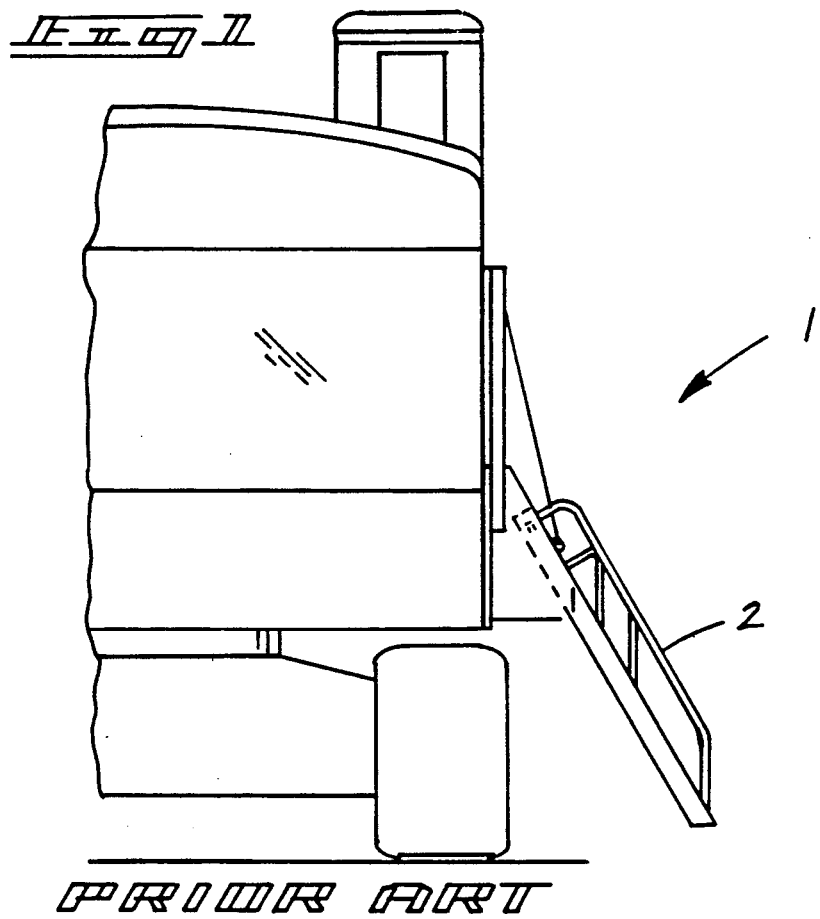
FIG. 1 is an orthographic rear view, taken in elevation, of a prior art removable staircase construction.
Figure 2:
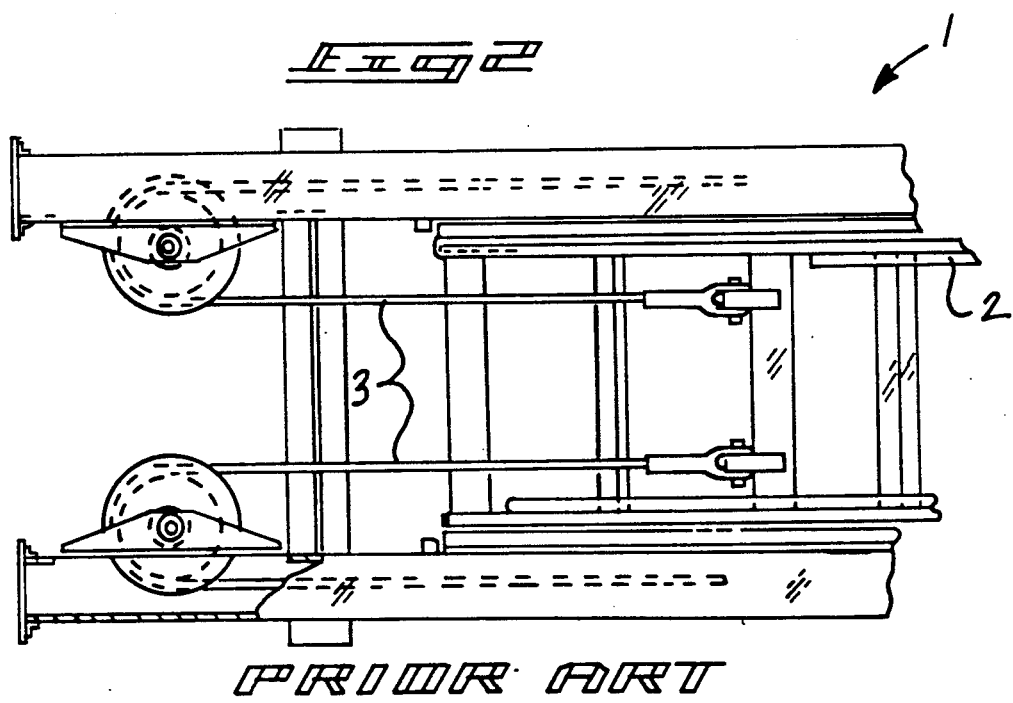
FIG. 2 is an orthographic top view of the removable staircase as set forth in FIG. 1.

With reference now to the drawings, and in particular to FIGS. 1 to 7 thereof, a new and improved truck cab accessory step apparatus embodying the principles and concepts of the present invention and generally designated by the reference numeral 10 will be described.

FIG. 1 illustrates a prior art removable stair organization 1, wherein the stair construction 2 is reciprocatably mounted relative utilizing cables 3 that are wound about spools between spaced side walls (see FIG. 2), in a manner as set forth in U.S. Pat. No. 4,243,120.

More specifically the truck cab accessory step apparatus 10 of the instant invention essentially comprises a truck cab 11, including truck cab side walls and a truck cab door 12 directed through at least one of the side walls. A truck cab wheel 13 is typically positioned underlying the door 12 overlying a tire and wheel assembly 14. A lower step 15 is fixedly mounted to the truck cab 11 at a lower peripheral edge thereof. A pneumatically operated auxiliary step 16 is provided and mounted to the truck cab side wall adjacent the door 12. The pneumatic auxiliary step 16 includes a pneumatic cylinder 17 longitudinally aligned and arranged generally parallel to the truck cab door rear edge 12a. A pneumatic cylinder 17 includes a pneumatic piston rod 18 reciprocatably mounted therewithin, wherein a respective first and second pneumatic conduit 19 and 20 are directed into the pneumatic cylinder at upper and lower terminal ends thereof to effect reciprocation of the pneumatic piston rod 18 within the cylinder 17. A step platform 21 is fixedly mounted to the piston rod 18 in an orthogonal relationship, with the step platform 21 mounted to the piston rod 18 adjacent a rear edge of the platform, as illustrated.

FIG. 4 illustrates a modified pneumatic auxiliary step 16a, including a single pneumatic pressure line 22 directed into a pneumatic valve 23. The pneumatic valve 23 includes a valve switch arm 24 to direct pneumatic pressure to respective upper or lower pneumatic conduit 25 or 26 directed from the valve 23 into upper and lower terminal ends of the cylinder 17 to effect reciprocation of the rod 18 therewithin, as noted above.

FIGS. 6-8 illustrate the modified pneumatic auxiliary step 16a, including a support handle 27 removably mounted within a plate bore 28 orthogonally directed through the step platform 21 adjacent a forward terminal end thereof remote from the mounting of the piston rod 18. The plate bore 28 is defined by a predetermined configuration to complementarily receive a handle projection 30, also formed of the predetermined cross-sectional configuration to be complementarily received within the plate bore 28. The handle projection 30 is coaxially aligned relative to the support handle 27, with a support handle support bar 29 mounted at an upper terminal end of the support handle 27. It is noted that the support handle 27 is removably mounted within the plate bore 28 to initially enhance securement and positioning of an individual upon the platform 21, whereupon subsequently the individual may remove the support handle 27 from the plate bore 28 and direct the handle projection 30 into a valve switch arm bore 31, also of the predetermined cross-sectional configuration to permit the individual to remotely rotate the valve switch arm utilizing the support handle 27 without requiring that individual to extend in a comprising or physically endangering orientation relative to the platform 21 and the truck cab 11.

It is noted that in the use of the pneumatic auxiliary step 16 as set forth in FIG. 3, each of the first and second pneumatic conduits 19 and 20 respectively is operative through a remotely positioned valve (not shown) positioned as required relative to the truck cab 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters patent of the U.S. is as follows:

1. A truck cab accessory step apparatus comprising, in combination, a truck cab, wherein the truck cab includes a planar side wall, with a door directed through the truck cab, the door positioned overlying a wheel well, and a pneumatic auxiliary step mounted to the truck cab side wall rearwardly of the door, and wherein the pneumatic auxiliary step includes a pneumatic cylinder, the pneumatic cylinder including a pneumatic piston rod reciprocatably mounted within the pneumatic cylinder, and conduit means to effect selective reciprocation of the piston rod relative to the cylinder, and a step platform including a step platform forward edge and a step platform rear edge, with the pneumatic cylinder orthogonally mounted to the step platform adjacent the step platform rear edge, and the door including a door rear edge, the pneumatic cylinder positioned generally parallel relative to the door rear edge, and wherein the conduit means includes an upper pneumatic conduit directed to an upper terminal end of the pneumatic cylinder, and a lower pneumatic conduit directed into a lower terminal end of the pneumatic conduit, and the upper and lower pneumatic conduits operably associated to a pneumatic valve, and the pneumatic valve receiving a single pneumatic line thereto, and a valve switch arm mounted exteriorly of the pneumatic valve to effect directing of pneumatic pressure selectively to the upper pneumatic conduit and the lower pneumatic conduit, and including a plate bore orthogonally directed through the step platform adjacent a platform forward edge, and the plate bore defined by a predetermined cylindrical configuration, and a support handle selectively mounted within the plate bore, and wherein the support handle includes a handle projection defined by the predetermined cross-sectional configuration receivable within said cylindrical configuration of said plate bore mounted coaxially to a lower terminal end of the support handle, and the valve switch arm including a valve switch arm bore, the valve switch arm bore defined by said predetermined cross-sectional configuration to permit selective rotation of the valve switch arm upon positioning the handle projection within the valve switch arm bore.

* * * * *